(12) United States Patent
Woo et al.

(10) Patent No.: US 11,196,034 B2
(45) Date of Patent: Dec. 7, 2021

(54) ELECTRODE HEATING DEVICE AND MANUFACTURING SYSTEM FOR SECONDARY BATTERY, WHICH COMPRISES THE SAME

(71) Applicant: LG Chem, Ltd., Seoul (KR)

(72) Inventors: Sang Jin Woo, Daejeon (KR); Young Ho Jeon, Daejeon (KR); Sin Young Park, Daejeon (KR); Tae Won Kang, Daejeon (KR); In Tae Chun, Daejeon (KR); Ji Soo Park, Daejeon (KR); Dong Hyeuk Park, Daejeon (KR); Yoon Bong Wi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 62 days.

(21) Appl. No.: 16/330,224

(22) PCT Filed: Jul. 16, 2018

(86) PCT No.: PCT/KR2018/008044
§ 371 (c)(1),
(2) Date: Mar. 4, 2019

(87) PCT Pub. No.: WO2019/035564
PCT Pub. Date: Feb. 21, 2019

(65) Prior Publication Data
US 2019/0229324 A1    Jul. 25, 2019

(30) Foreign Application Priority Data

Aug. 17, 2017  (KR) .................. 10-2017-0103995
Aug. 17, 2017  (KR) .................. 10-2017-0103996
Jun. 29, 2018  (KR) .................. 10-2018-0075224

(51) Int. Cl.
*H01M 4/04* (2006.01)
*F26B 3/28* (2006.01)
(Continued)

(52) U.S. Cl.
CPC ............. *H01M 4/0471* (2013.01); *F26B 3/28* (2013.01); *F26B 3/30* (2013.01); *F26B 13/06* (2013.01);
(Continued)

(58) Field of Classification Search
CPC .... F26B 13/06; F26B 3/28; F26B 3/30; H01J 61/16; H01M 10/04; H01M 10/0404;
(Continued)

(56) References Cited

U.S. PATENT DOCUMENTS 2,668,364 A * 2/1954 Colton ...................... F26B 3/30
                                                    34/266
5,595,118 A * 1/1997 Villaverde, Sr. ........ B41F 23/04
                                                    101/424.1
(Continued)

FOREIGN PATENT DOCUMENTS

CN      102026428 A     4/2011
CN      202284725 U     6/2012
(Continued)

OTHER PUBLICATIONS

International Search Report for International Patent Application No. PCT/KR2018/008044, dated Oct. 4, 2018, 4 pages.
(Continued)

*Primary Examiner* — Jorge A Pereiro
*Assistant Examiner* — Logan P Jones
(74) *Attorney, Agent, or Firm* — Birch, Stewart, Kolasch & Birch, LLP

(57) ABSTRACT

The present invention relates to an electrode heating device that dries an electrode. The electrode heating device comprises a heating body having a drying space through which the electrode passes, and a heating member that directly heats and dries a surface of the electrode that passes through the drying space to remove moisture from the electrode.

9 Claims, 7 Drawing Sheets

(51) Int. Cl.
*F26B 13/06* (2006.01)
*H05B 3/00* (2006.01)
*H01M 10/04* (2006.01)
*H01J 61/16* (2006.01)
*H05B 3/03* (2006.01)
*F26B 3/30* (2006.01)

(52) U.S. Cl.
CPC .............. *H01J 61/16* (2013.01); *H01M 4/04* (2013.01); *H01M 10/04* (2013.01); *H01M 10/0404* (2013.01); *H05B 3/00* (2013.01); *H05B 3/03* (2013.01)

(58) Field of Classification Search
CPC ........ H01M 4/04; H01M 4/0471; H05B 3/00; H05B 3/03
See application file for complete search history.

(56) References Cited

U.S. PATENT DOCUMENTS

| | | | | |
|---|---|---|---|---|
| 6,024,773 | A * | 2/2000 | Inuzuka | H01M 10/0525 29/623.4 |
| 2006/0141851 | A1 * | 6/2006 | Matsui | F21V 29/73 439/490 |
| 2006/0201017 | A1 * | 9/2006 | Ellis | F26B 15/14 34/276 |
| 2008/0259595 | A1 | 10/2008 | Stowell et al. | |
| 2011/0067260 | A1 | 3/2011 | Kim et al. | |
| 2012/0285036 | A1 * | 11/2012 | Matsuyama | H01M 4/139 34/406 |
| 2013/0174393 | A1 | 7/2013 | Inahara | |
| 2014/0201983 | A1 | 7/2014 | Song et al. | |
| 2014/0304980 | A1 * | 10/2014 | Kim | H01M 10/0436 29/623.1 |
| 2015/0034249 | A1 | 2/2015 | Lee et al. | |
| 2015/0089831 | A1 * | 4/2015 | Jang | F26B 13/10 34/406 |
| 2015/0311490 | A1 | 10/2015 | Murase et al. | |
| 2016/0093880 | A1 * | 3/2016 | Song | H01M 4/661 429/217 |
| 2016/0104912 | A1 | 4/2016 | Inahara | |
| 2016/0141108 | A1 | 5/2016 | Inahara | |
| 2018/0328662 | A1 | 11/2018 | Niklaus et al. | |

FOREIGN PATENT DOCUMENTS

| | | | | |
|---|---|---|---|---|
| CN | 103017496 | A | | 4/2013 |
| CN | 104247128 | A | | 12/2014 |
| CN | 105486059 | A | | 4/2016 |
| CN | 205249626 | U | | 5/2016 |
| CN | 105618089 | A | | 6/2016 |
| CN | 105891551 | A | | 8/2016 |
| CN | 205758039 | U | | 12/2016 |
| CN | 206073623 | U | | 4/2017 |
| DE | 29916572 | U1 | | 12/1999 |
| GB | 713612 | A | | 8/1954 |
| GB | 2336895 | A | | 11/1999 |
| JP | 09129221 | A | * | 5/1997 |
| JP | 2004-71472 | A | | 3/2004 |
| JP | 2006-012712 | A | | 1/2006 |
| JP | 2011-134545 | A | | 7/2011 |
| JP | 2013-137168 | A | | 7/2013 |
| JP | 5325332 | B1 | | 10/2013 |
| JP | 2014-107237 | A | | 6/2014 |
| JP | 2014-117901 | A | | 6/2014 |
| KR | 10-1045958 | B1 | | 6/2011 |
| KR | 10-2013-0103721 | A | | 9/2013 |
| KR | 10-2014-0094908 | A | | 7/2014 |
| KR | 10-2015-0037089 | A | | 4/2015 |
| KR | 10-2015-0089000 | A | | 8/2015 |
| KR | 10-1572720 | B1 | | 11/2015 |
| WO | WO 2011/038996 | A1 | | 4/2011 |
| WO | WO-2011078309 | A1 | * | 6/2011 .......... H01M 4/0402 |
| WO | 2017/081172 | A1 | | 5/2017 |

OTHER PUBLICATIONS

Supplementary European Search Report corresponding to European Patent Application No. 18846383.0 dated Aug. 6, 2019, 7 pages.

* cited by examiner

ELECTRODE HEATING DEVICE AND MANUFACTURING SYSTEM FOR SECONDARY BATTERY, WHICH COMPRISES THE SAME

CROSS-REFERENCES TO RELATED APPLICATIONS

This application is a U.S. national phase application, pursuant to 35 U.S.C. § 371, of PCT/KR2018/008044, filed Jul. 16, 2018, designating the United States, which claims priority to Korean Application No. 10-2017-0103995, filed Aug. 17, 2017, Korean Application No. 10-2017-0103996, filed Aug. 17, 2017, and Korean Application No. 10-2018-0075224, filed Jun. 29, 2018. The entire contents of the aforementioned patent applications are incorporated herein by this reference.

TECHNICAL FIELD

The present invention relates to an electrode heating device and a manufacturing system for a secondary battery, which comprises the same, and more particularly, to an electrode heating device, which directly heats and dries a surface of an electrode to remove moisture remaining on the electrode, and a manufacturing system for a secondary battery, which comprises the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly, in which an electrode and a separator are alternately laminated, and a case accommodating the electrode assembly. A process of manufacturing the secondary battery comprises a process of manufacturing an electrode, a process of alternately laminating the manufactured electrode and a separator to manufacture an electrode assembly, a lamination process of thermally bonding the electrode assembly, a process of accommodating the electrode assembly into a case to manufacture an unfinished secondary battery, and an activation process of charging and discharging the unfinished secondary battery.

The electrode is manufactured through a mixing process, a coating process, a press process, and a slitting process. Here, the coating process comprises a coating process of applying an electrode active material to a surface of a collector and a drying process of drying the electrode active material applied to the collector. The drying process dries the electrode active material applied to the collector using hot air.

However, since the drying process uses the hot air, it takes a long time to dry the electrode active material applied to the collector. Thus, the electrode may be significantly deteriorated in productivity.

DISCLOSURE OF THE INVENTION

Technical Problem

To solve the above-described problems, an object of the present invention is to provide an electrode heating device, which directly heats and dries a surface of an electrode to quickly remove moisture remaining on the electrode to significantly reduce a working time and thereby to significantly improve productivity of the electrode, and a manufacturing system for a secondary battery, which comprises the same.

Technical Solution

To achieve the above object, an electrode heating device for drying an electrode according to a first embodiment of the present invention comprises a heating body having a drying space through which the electrode passes, and a heating member that directly heats and dries a surface of the electrode that passes through the drying space to remove moisture from the electrode.

The heating member may comprise a mounting part provided in the drying space, and a plurality of heating lamps installed on the mounting part and disposed close to the surface of the electrode to directly heat and dry the surface of the electrode, thereby removing the moisture from the electrode.

The mounting part may comprise a fixed plate provided in the drying space, and a guide plate which is slidably coupled to the fixed plate and on which the plurality of heating lamps are installed.

The heating body may comprise an inlet which is provided through a left surface and through which the electrode is introduced, an outlet which is provided through a right surface and through which the electrode introduced into the drying space is discharged, and a cover coupled to a surface between the inlet and the outlet, wherein the cover may be opened and separated from the heating body so that the drying space communicates with the outside, and the guide plate may be coupled to the fixed plate and be slid toward the cover to be withdrawn from the drying space when the cover is opened.

A transfer roller that transfers the electrode introduced into the drying space may be further provided in the heating body, the transfer roller may comprise a first transfer roller disposed on an inlet-side of the drying space, a second transfer roller disposed on an upper portion of a left side of the drying space, a third transfer roller disposed on an upper portion of a right side of the drying space, and a fourth transfer roller disposed on an outlet-side of the drying space, the heating member may be provided at one or more places between the first transfer roller and the second transfer roller, between the second transfer roller and the third transfer roller, and between the third transfer roller and the fourth transfer roller, and the electrode introduced into the drying space may be transferred along the first to fourth transfer rollers and dried by the heating member.

The heating member may be provided to correspond to each of both surfaces of the electrode to directly heat and dry both the surfaces of the electrode at the same time.

The heating member that heats one surface of the electrode, which faces a wall of the drying space, may be installed on the wall of the drying space, and the heating member that dries the other surface of the electrode may be installed on an auxiliary frame provided within the drying space.

The heating lamp may be spaced from the surface of the electrode by a distance of 2 mm to 10 mm.

The electrode heating device may further comprise an exhaust member that discharges air containing the moisture from the drying space to the outside.

The exhaust member may comprise an exhaust duct disposed on an outer surface of the heating body to discharge the air from the drying space to the outside and an exhaust pump that generates a suction force to forcibly discharge the air from the drying space to the outside through the exhaust duct.

The heating lamp may be an infrared lamp or a xenon lamp.

A guide groove may be formed in the fixed plate, and a guide protrusion slidably coupled to the guide groove may be formed on the guide plate.

Each of the fixed plate and the guide plate may be made of heat dissipation material that absorbs heat generated from the plurality of heating lamps to release the heat to the outside.

A manufacturing system for a secondary battery according to a second embodiment of the present invention comprises a supply device that supplies an electrode, an electrode heating device that directly heats and dries a surface of the electrode supplied from the supply device to remove moisture from the electrode, and a collection device that collects the electrode from which the moisture is removed by the electrode heating device, wherein the electrode heating device comprises a heating body having a drying space through which the electrode supplied from the supply device passes, and a heating member that directly heats and dries the surface of the electrode that passes through the drying space to remove the moisture from the electrode.

A manufacturing system for a secondary battery according to a third embodiment of the present invention comprises a manufacturing device that manufactures an electrode, an electrode heating device that directly heats and dries a surface of the electrode manufactured by the manufacturing device to remove moisture from the electrode, and a lamination device that alternately laminates the electrode, from which the moisture is removed by the electrode heating device, and a separator to bond the electrode and the separator to each other using heat and pressure, wherein the electrode heating device comprises a heating body having a drying space through which the electrode manufactured by the manufacturing device passes, and a heating member that directly heats and dries the surface of the electrode that passes through the drying space to remove the moisture from the electrode.

Advantageous Effects

1. The electrode heating device according to the present invention may comprise the heating body and the heating member. Thus, the surface of the electrode may be directly heated and dried to quickly remove the moisture remaining on the electrode. As a result, the working time may be significantly reduced to significantly improve the productivity.

2. The heating member according to the present invention may comprise the mounting part and the plurality of heating lamps. Thus, the surface of the electrode may be directly heated and dried by the heat emitted from the plurality of heating lamps to more quickly remove the moisture remaining on the electrode.

3. The mounting part according to the present invention may comprise the fixed plate and the guide plate which is slidably coupled to the fixed plate and on which the plurality of heating lamps are installed. Thus, the guide plate may be withdrawn from the heating body to easily replace the plurality of heating lamps, thereby improving the efficiency of the work.

4. The heating body according to the present invention may comprise the inlet through which the electrode is introduced, the outlet through which the electrode is discharged, and the cover. Thus, the heating member mounted inside the heating body may be withdrawn from the heating body to be easily repaired. Particularly, the guide plate may be slid toward the cover to more easily replace the plurality of heating lamps installed on the guide plate.

5. The present invention may comprise the transfer roller that transfers the electrode introduced into the heating body. Thus, the electrode may be stably guided from the inlet to the outlet of the heating body. Therefore, the heating member may directly heat the surface of the electrode stably.

6. The transfer roller according to the present invention may comprise the first to fourth transfer rollers installed at each of the vertexes of the heating body. Thus, the electrode introduced into the heating body may be maximally circulated to increase in residence time, thereby improving the drying rate of the electrode.

7. The heating units according to the present invention may be respectively installed between the first and second transfer rollers, between the second and third transfer rollers, and between the third and fourth transfer rollers. Thus, the electrode transferred along the first to fourth transfer rollers may be effectively dried to improve the drying rate of the electrode.

8. The heating device according to the present invention may be provided on each of both surfaces of the electrode. Thus, both surfaces of the electrode may be dried at the same time to improve the efficiency of the work and reduce the working time.

9. The heating body according to the present invention may comprise the auxiliary frame for installing the heating member. Thus, the heating member that is installed on other than the wall of the heating body may be stably installed.

10. The electrode heating device according to the present invention may comprise the exhaust member that discharges the air within the heating body to the outside. Thus, the air that contains the moisture within the heating body may be discharged to the outside to significantly increase the drying rate of the electrode.

11. The exhaust member according to the present invention may be provided on the outer surface of the heating body. Thus, the droplets may be prevented from being generated on the boundary line between the heating body and the exhaust member.

12. The exhaust member according to the present invention may comprise the exhaust duct and the exhaust pump. Thus, the air within the heating body may be more quickly discharged to the outside.

13. The heating lamp according to the present invention may be an infrared lamp or a xenon lamp. The infrared lamp may be a far-infrared lamp. That is, the far-infrared lamp may emit an infrared ray having a wavelength of 25 μm or more, which is greater than a wavelength of the visible light. Thus, the infrared ray may be invisible to the eye and have a high heating effect and a strong penetration power to achieve the superior drying efficiency. Also, the xenon light may be brighter than the filament and also may emit light from the bulb, but from the filament, to more widely and quickly dry the surface of the electrode. Particularly, the xenon light may have a lifespan longer than a lifespan of the filament to greatly reduce the maintenance cost.

MODE FOR CARRYING OUT THE INVENTION

Figure 1:
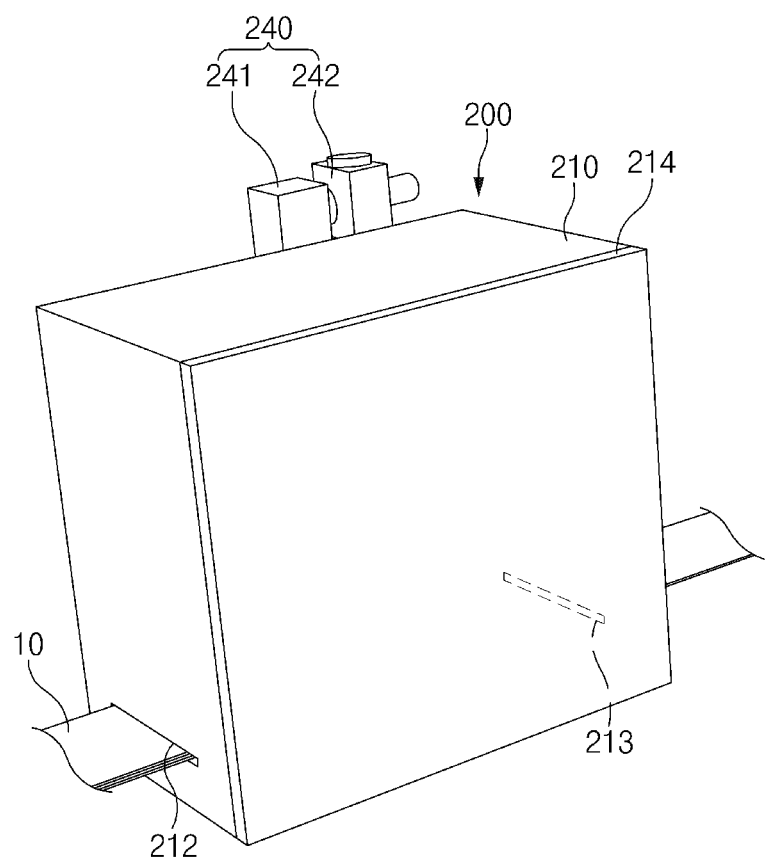
FIG. 1 is a perspective view of an electrode heating device according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode]

Referring to FIG. 1, an electrode 10 according to the present invention comprises a collector and an electrode active material applied to one surface or both surfaces of the collector. In particular, the electrode 10 may be manufactured by applying the electrode active material to the one surface or both the surfaces of the collector.

Here, in a process of manufacturing the electrode 10 as described above, although the electrode active material is dried, a portion of moisture may remain. Thus, a drying process of drying the electrode may be performed. Here, an electrode heating device may be used.

[Electrode Heating Device]

Figure 2:
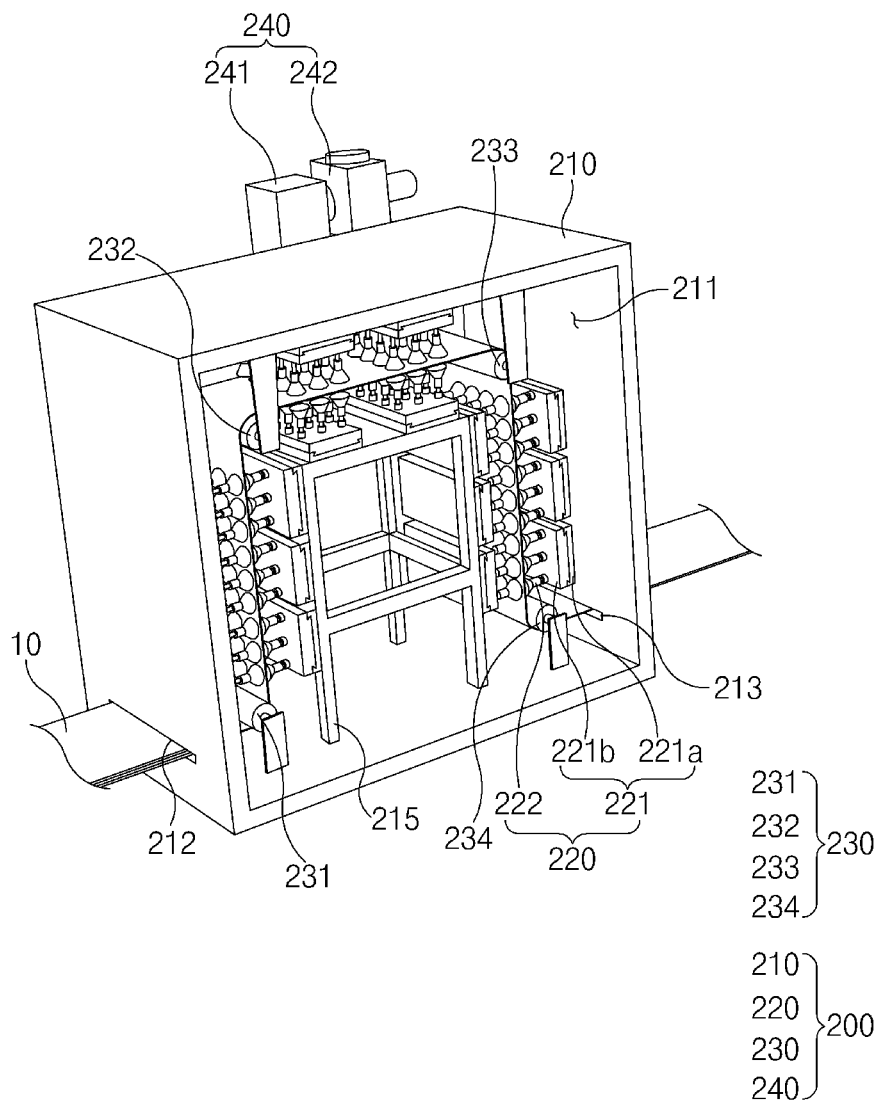
FIG. 2 is a perspective view illustrating a state in which a cover of the electrode heating device is opened according to the first embodiment of the present invention.
Figure 3:
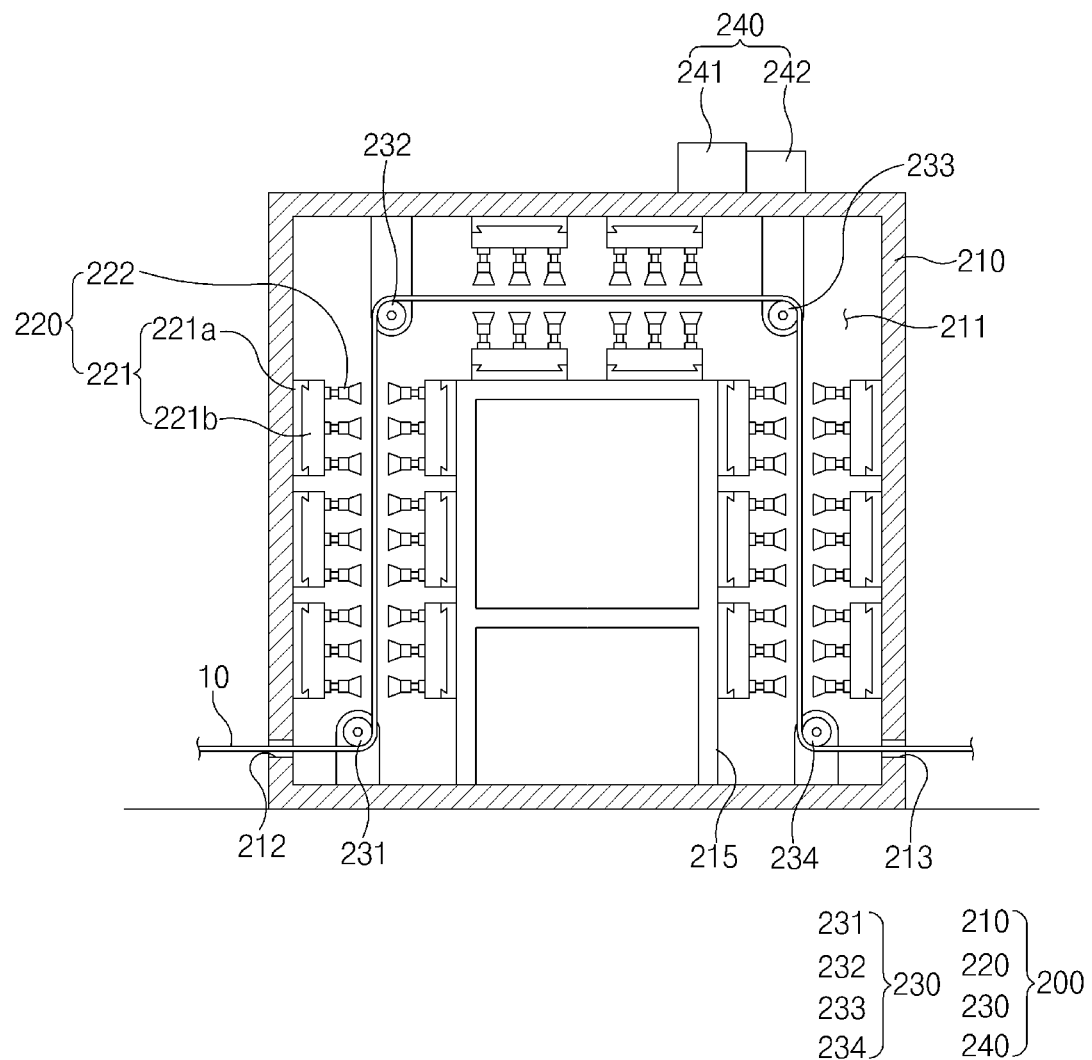
FIG. 3 is a front view illustrating the state in which the cover of the electrode heating device is opened according to the first embodiment of the present invention.

As illustrated in FIGS. 1 to 3, the heating device 200 comprises a heating body 210 through which the electrode 10 passes and a heating member 220 that directly heats and dries the electrode that passes through the heating body 210 to remove the moisture remaining on the electrode 10.

The heating body 210 has a rectangular box shape and comprises a drying space 211 through which the electrode 10 passes, an inlet 212 which is provided in a left surface (a left surface of the heating body when viewed in FIG. 1) and through which the supplied electrode 10 is introduced, an outlet 213 which is provided in a right surface (a right surface of the heating body when viewed in FIG. 1) and through which the electrode 10 introduced into the drying space 211 is discharged, and a cover 214 coupled to one surface (a front surface of the heating body when viewed in FIG. 1) between the inlet 212 and the outlet 213. Here, the cover 214 may be separated from the heating body 210 to open the drying space 211 so that the drying space 211 communicates with the outside.

In the heating body 210 having the above-described structure, the electrode 10 is introduced into the drying space 211 through the inlet 212, and subsequently, the electrode 10 introduced into the drying space 211 is discharged through the outlet 213. Here, the cover 214 may be attached and detached to open and close the drying space 211.

The cover 214 may be made of a transparent or translucent heat-resistant material. Thus, the drying space 211 may be easily recognized from the outside.

The heating member 220 may be configured to directly dry the electrode introduced into the drying space 211 of the heating body. The heating member 220 comprises a mounting part 221 provided in the drying space 211 and a plurality of heating lamps 222 installed in the mounting part 221 and disposed close to the surface of the electrode 10 to directly heat and dry the surface of the electrode 10 and thereby to remove the moisture remaining on the electrode 10.

The mounting part 221 may have a structure in which the plurality of heating lamps 222 provided in the drying space 211 are more easily replaced. For example, the mounting part 221 comprises a fixed plate 221a provided in the drying space 211 and a guide plate 221b which is slidably coupled to the fixed plate 221a and on which the plurality of heating lamps 222 are installed. In particular, referring to FIG. 4, a guide groove 221a-1 is formed in the fixed plate 221a, and a guide protrusion 221b-1 slidably coupled to the guide groove 221a-1 is formed on the guide plate 221b.

Thus, in the mounting part 221, the guide plate 221b may be easily withdrawn from the drying space 211 due to the guide groove 221a-1 and the guide protrusion 221b-1. As a result, the plurality of heating lamps 222 installed on the guide plate 221b may be easily replaced outside the drying space 211 to facilitate maintenance.

Here, the guide plate 221b may be coupled to the fixed plate 221a and be slid toward the cover 214. Thus, the plurality of heating lamps 222 installed on the guide plate 221b may be withdrawn from the drying space 211 only by the small movement of the guide plate 221b.

In the mounting part 221, when the plurality of heating lamps 222 provided on the guide plate 221b and the surface of the electrode 10 do not match each other, the guide plate 221b may be slid along the guide groove 221a-1 of the fixed plate 221a to allow the plurality of heating lamps 222 and the surface of the electrode 10 to match each other.

The guide plate 221b may be detachably coupled to the fixed plate 221a. In particular, when the plurality of heating lamps 222 are replaced, the replacement of the plurality of heating lamps 222 is performed outside the drying space 211 after the guide plate 221b is detached from the fixed plate 221a. Subsequently, when the replacement of the heating lamps 222 is completed, the guide plate 221b is coupled again to the fixed plate 221a.

Each of the fixed plate 221a and the guide plate 221b of the mounting part 221 may be a heatsink plate made of a heat dissipation material, which absorbs heat generated in the plurality of heating lamps 222 to release the heat to the outside. Thus, an increase in temperature of the heating lamps 222 may be suppressed.

Figure 4:
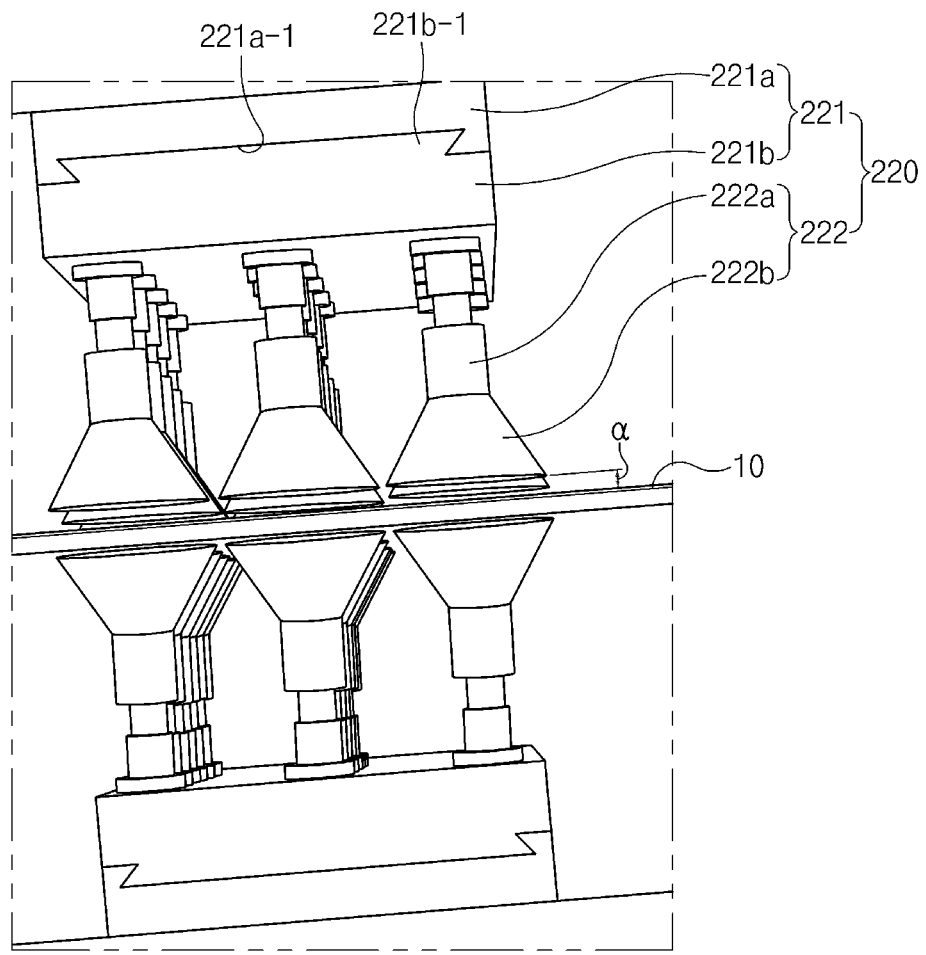
FIG. 4 is a partial enlarged view of FIG. 2.

As illustrated in FIGS. 3 and 4, each of the heating lamps 222 comprises a power source part 222a installed on the guide plate 221b to receive a current from the outside and a light source part 222b that emits light with the current supplied from the power source part 222a.

Here, the light source part 222b may be disposed close to the surface of the electrode 10. For example, the light source part 222b may be disposed to be spaced from the surface of the electrode 10 by a distance 'a' as illustrated in FIG. 4. In particular, the light source part 222b may be disposed with a distance of 2 mm to 10 mm from the surface of the electrode 10. When the light source part 222b is spaced by a distance of 2 mm or less from the surface of the electrode 10, the electrode 10 may be damaged due to friction between the light source part 222b and the electrode 10. When the light source part 222b is spaced by a distance of 10 mm or more from the surface of the electrode 10, the light emitted from the light source part 222b is irradiated onto the surface of the electrode 10 in a diffused state to deteriorate a drying rate of the electrode 10.

Thus, the heating lamp 222 may be disposed to be spaced by a distance of 2 mm to 10 mm from the surface of the electrode 10 to stably dry the electrode 10 and thereby to remove the moisture remaining on the electrode 10 without damaging the electrode 10.

The heating lamp 222 may be an infrared lamp or a xenon lamp. Also, the infrared lamp comprises a near-infrared lamp, a medium-infrared lamp, and a far-infrared lamp. Here, preferably, the far-infrared lamp is used as the infrared lamp.

In particular, the far-infrared lamp may emit an infrared ray having a wavelength of 25 μM or more, which is greater than a wavelength of the visible light. Thus, the infrared ray may be invisible to the eye and have a high heating effect and a strong penetration power to achieve a superior drying efficiency. Also, the xenon light may be brighter than a filament and also may emit light from the bulb, but from the filament, to more widely and quickly dry the surface of the electrode. Particularly, the xenon light may have a lifespan longer than a lifespan of the filament to greatly reduce the maintenance cost.

The plurality of heating lamps 222 may be regularly or irregularly installed on the guide plate 221b. Particularly, a distance between the plurality of heating lamps 222, which are regularly or irregularly installed on the guide plate 221b, may be a distance in which portions of the light irradiated onto the electrode 10 overlap each other. Thus, the entire surface of the electrode 10 may be directly heated and dried.

The heating device 200 may further comprise a transfer roller that transfers the electrode introduced into the drying space 211 and constantly maintains a tension force. Particularly, the transfer roller 230 may have a structure in which the electrode 10 introduced into the drying space 211 is circulated with a maximum length. The heating member 220 may directly heat the electrode 10 transferred along the transfer roller 230 to more effectively remove the moisture remaining on the electrode 10.

For example, the transfer roller 230 comprises a first transfer roller 231 disposed on a side of the inlet 212 of the drying space 211, a second transfer roller 232 disposed on an upper portion of the left side of the drying space 211, a third transfer roller 233 disposed on an upper portion of the right side of the drying space 211, and a fourth transfer roller 234 disposed on a side of the outlet 213 of the drying space 211.

Here, the inlet 212 is disposed on a lower end of the left surface of the drying space 211, and the outlet 213 is disposed on a lower end of the right surface of the drying space 211.

Thus, the transfer roller 230 may transfer the electrode introduced into the drying space 211 along the left surface, a top surface, and the right surface of the drying space. As a result, a length and a residence time of the electrode introduced into the drying space 211 may increase, and thus, a drying time through the heating member 220 may naturally increase.

The heating member 220 may be provided between the first transfer roller 231 and the second transfer roller 232, between the second transfer roller 232 and the third transfer roller 233, and between the third transfer roller 233 and the fourth transfer roller 234. Thus, the electrode 10 transferred along the first to fourth transfer rollers 231, 232, 233, and 234 may be directly heated and dried for a long time by the heating member 220 to completely remove the moisture remaining on the electrode 10.

The heating member 220 may dry both surfaces of the electrode 10 at the same time so that the heating rate of the electrode 10 increases. In other words, the heating member 220 may be disposed to correspond to both surfaces of the electrode 10 to dry both surfaces of the electrode 10 at the same time.

Here, the heating member 220 that dries one surface (an outer surface of the electrode when viewed in FIG. 3) of the electrode 10, which faces the wall of the drying space 211, may be installed on the wall of the drying space 211. The heating member 220 that dries the other surface (an inner surface of the electrode when viewed in FIG. 3) of the electrode 10 may be installed on an auxiliary frame 215 provided within the drying space 211. Thus, all of the heating members 220 provided in the drying space 211 may be stably installed.

The heating device 200 may further comprise an exhaust member 240 that discharges air containing the moisture in the drying space 211 to the outside. The heating device 200 may quickly discharge the moisture vaporized from the surface of the electrode 10 through the exhaust member 240 to increase the drying rate of the electrode 10.

Particularly, the exhaust member 240 is disposed on the outer surface of the heating body 210, more preferably, an upper portion of a rear surface of the heating body 210 when viewed in FIG. 2. When the exhaust member 240 is disposed on the top surface of the heating body 210, hot air in the drying space 211 and cold air outside the exhaust member 240 may contact each other to generate droplets on a boundary line between the heating body 210 and the exhaust member 240. To prevent this phenomenon, the exhaust member 240 may be installed on the upper portion of the rear surface of the heating body 210 so that the hot air in the drying space 211 is bypassed to a lower portion of the drying space 211 to decrease the temperature and is subsequently discharged to prevent the droplets from being generated on the boundary line between the heating body 210 and the exhaust member 240.

As described above, the exhaust member 240 comprises an exhaust duct 241 disposed on the outer surface of the heating body 210 to discharge the air from the drying space 211 to the outside and an exhaust pump 242 that generates a suction force to forcibly discharge the air from the drying space 211 to the outside through the exhaust duct 241. Thus, the air that contains the moisture within the drying space 211 may be forcibly discharged to the outside more quickly, and thus, the drying rate may increase.

Thus, the electrode heating device 200 comprising the above-described constituents according to the first embodiment of the present invention may directly heat and dry the surface of the electrode 10 to quickly remove the moisture remaining on the electrode 10. Thus, the working time may be significantly reduced to significantly improve productivity.

Hereinafter, in description of an electrode assembly to another embodiment of the present invention, constituents having the same configuration and function as those according to the foregoing first embodiment have been given with the same reference numeral in the drawings, and thus their duplicated descriptions will be omitted.

[Manufacturing System for Secondary Battery According to a Second Embodiment]

A manufacturing system for a secondary battery according to a second embodiment of the present invention comprises a supply device 100 that supplies an electrode 10, an electrode heating device 200 that dries the electrode 10 supplied from the supply device 100, and a collection device 300 that collects the electrode 10 dried by the electrode heating device 200.

Supply Device

Figure 5:
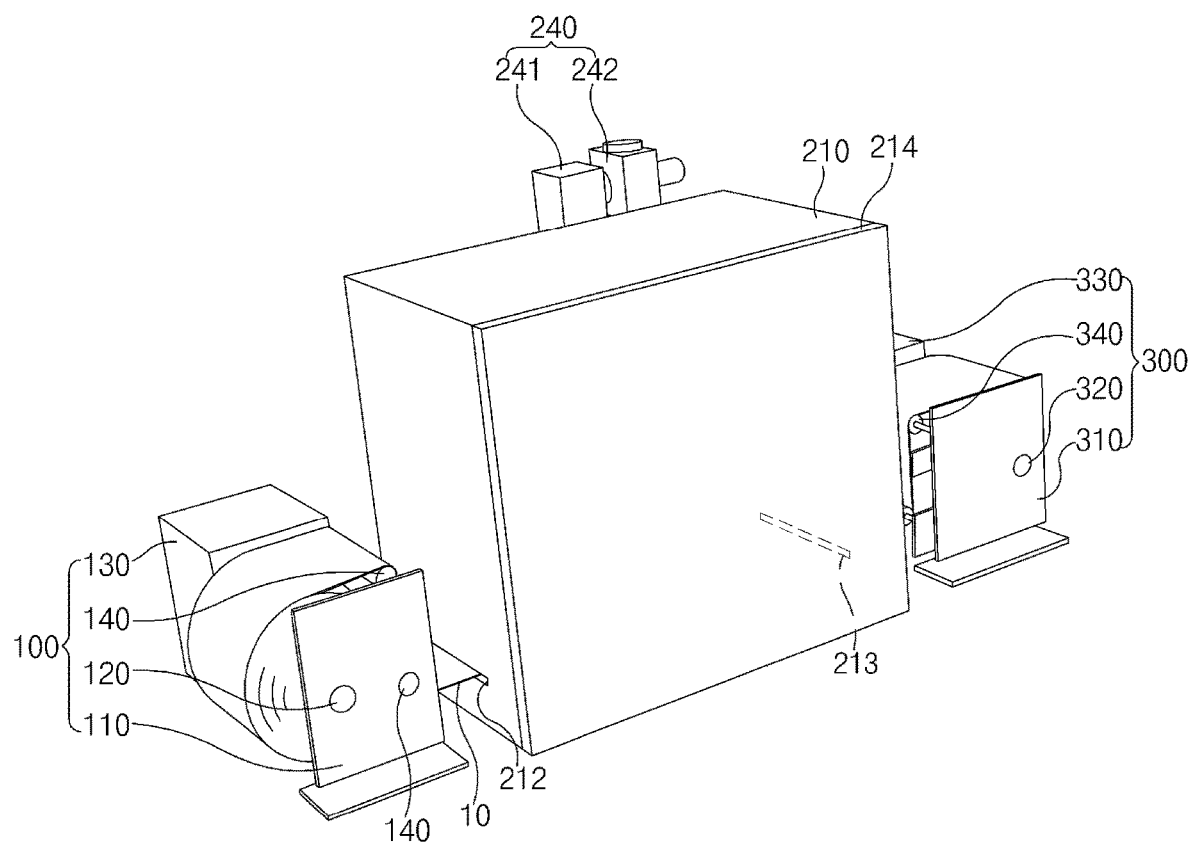
FIG. 5 is a perspective view illustrating a manufacturing system for a secondary battery according to a second embodiment of the present invention.
Figure 6:
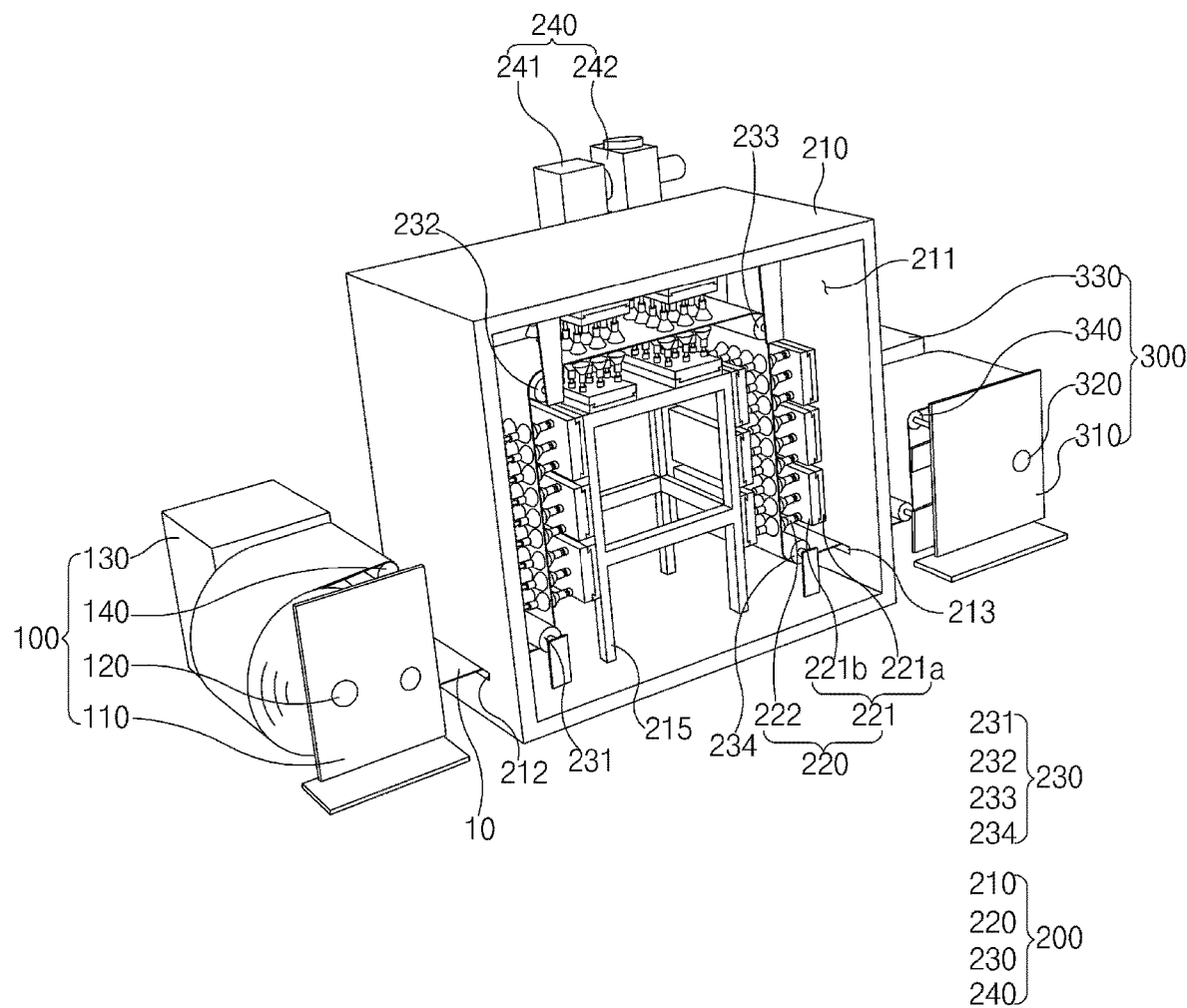
FIG. 6 is a perspective view illustrating a state in which a cover of the manufacturing system for the secondary battery is opened according to the second embodiment of the present invention.

Referring to FIGS. 5 and 6, the supply device 100 comprises a supply body 110 configured to supply the electrode 10 and comprising a bottom plate and a support plate disposed to correspond to each of both sides of the bottom plate, a supply roller 120 rotatably disposed between the support plates of the supply body 110 to supply the wound electrode 10, a supply motor 130 that rotates the supply roller 120 to supply the wound electrode 10 to the supply roller 120, and a supply guide roller 140 that guides the electrode 10 supplied from the supply roller 120 and adjusts a tension force.

In the supply device 100, the supply roller 120 rotates within the supply body 110 by a driving force of the supply motor 130. Thus, the wound electrode 10 is gradually unwound while the supply roller 120 rotates and is subsequently supplied to the electrode heating device 200. Here, the electrode 10 supplied from the supply roller 120 has a uniform tension force while being guided by the supply guide roller 140.

Electrode Heating Device

Referring to FIGS. 1 and 2, the electrode heating device 200 comprises a heating body 210 through which the electrode 10 supplied from the supply device 100 passes and a heating member 220 that directly heats and dries a surface of the electrode that passes through the heating body 210 to remove moisture remaining on the electrode 10.

The electrode heating device may have the same constituents as those of the electrode heating device according to the foregoing first embodiment, and thus, their duplicated description will be omitted.

Collection Device

Referring to FIGS. 5 and 6, the collection device 300 is configured to collect the dried electrode 10 that passes through the electrode heating device 200 and comprises a collection body 310 comprising a bottom plate and a support plate disposed to correspond to each of both sides of the bottom plate, a collection roller 320 rotatably disposed between the support plates of the collection roller 310 to wind and collect the electrode 10 discharged from the electrode heating device 200, a collection motor 330 that rotates the collection roller 320 to wind the electrode 10, and a collection guide roller 340 that guides the electrode 10 collected from the collection roller 120 and adjusts a tension force.

The collection device may stably collect the electrode 10 discharged from the electrode heating device 200 while maintaining the tension force.

In the manufacturing system for the secondary battery comprising the above-described constituents according to the second embodiment of the present invention, the surface of the electrode may be directly heated and dried to quickly remove the moisture remaining on the electrode, thereby reducing the drying time and improving the productivity.

Hereinafter, a drying method using the manufacturing system for the secondary battery according to the second embodiment of the present invention will be described.

[Manufacturing Method for Secondary Battery According to the Second Embodiment]

First, in the manufacturing system for the secondary battery according to the present invention, an electrode 10 is introduced into a drying space 211 through an inlet 212 formed in a heating body 210 of an electrode heating device 200, and the electrode 10 introduced into the drying space 211 is transferred along first to fourth transfer rollers 231, 232, 233, and 234 of a transfer roller 230. Subsequently, the electrode transferred along the first to fourth transfer rollers 231, 232, 233, and 234 is continuously dried by heating members 220, which are respectively disposed between the first transfer roller 231 and the second transfer roller 232, between the second transfer roller 232 and the third transfer roller 233, and between the third transfer roller 233 and the fourth transfer roller 234.

Here, each of the heating members 220 may directly heat and dry both surfaces of the electrode 10 with a plurality of heating lamps 222 to quickly remove moisture remaining on the electrode 10, and an exhaust member 240 may discharge air within the drying space 211 to the outside to increase in drying rate of the electrode 10.

When a lifespan of a heating lamp among the plurality of heating lamps 222 is ended, the plurality of heating lamps 222 may be withdrawn from the drying space 211 due to a fixed plate 221a and a guide plate 221b of a mounting part 221 provided in the heating member 220. Thus, the heating lamp may be easily replaced.

The electrode 10 transferred through the fourth transfer roller 234 may be discharged through an outlet 213 of the heating body 210, and the electrode 10 discharged through the outlet 213 may be collected while being wound around the collection device 300.

[Manufacturing System for Secondary Battery According to a Third Embodiment]

Figure 7:
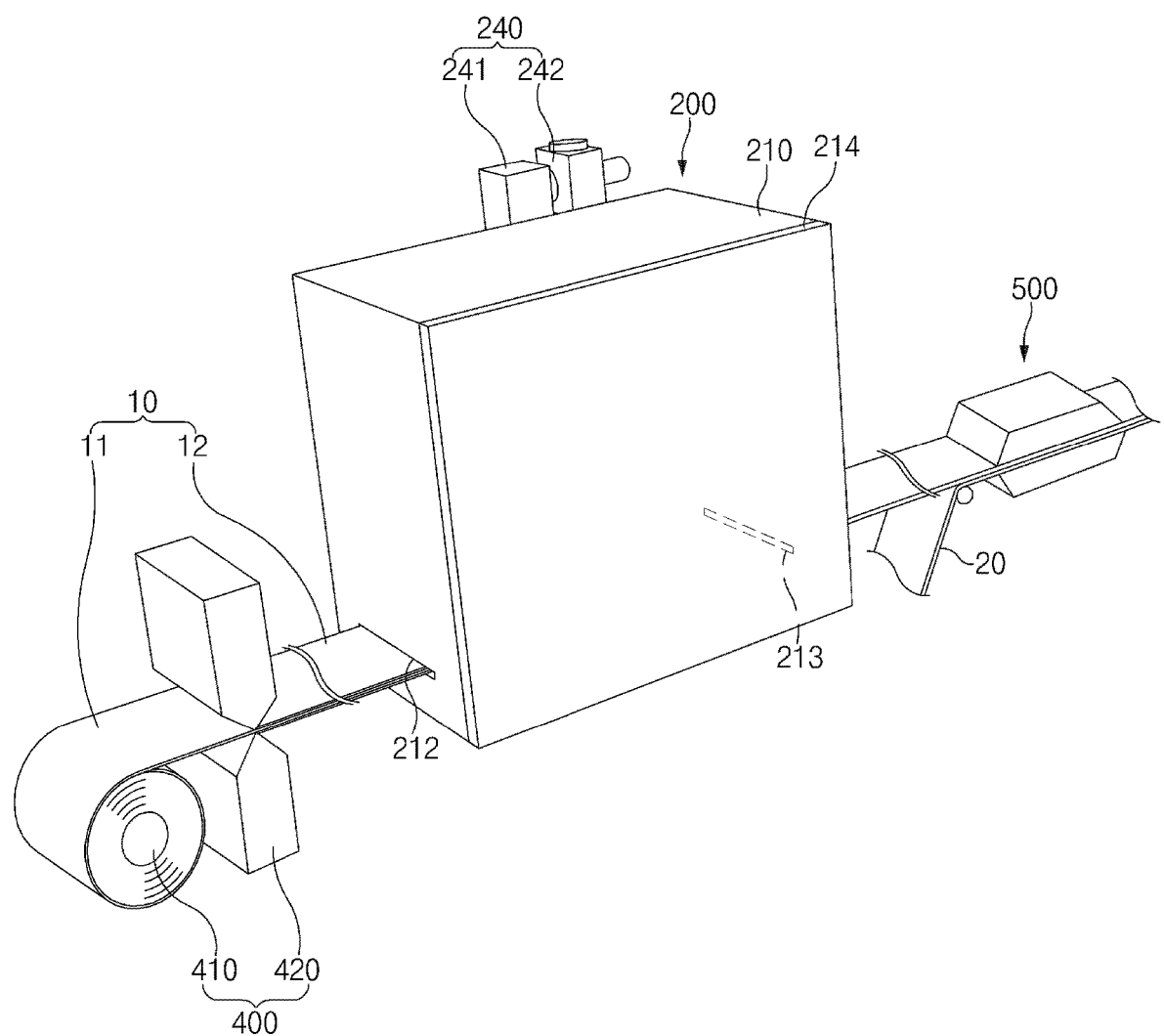
FIG. 7 is a perspective view illustrating a manufacturing system for a secondary battery according to a third embodiment of the present invention.

As illustrated in FIG. 7, a manufacturing system for a secondary battery according to a third embodiment of the present invention comprises a manufacturing device 400 manufacturing an electrode 10, an electrode heating device 200 that directly heats and dries a surface of the electrode 10 manufactured by the manufacturing device 400 to remove moisture remaining on the electrode 10, and a lamination device 500 that alternately laminates the electrode 10, from which the moisture is removed by the electrode heating device 200, and a separator 20 to bond the electrode 10 and the separator 20 to each other using heat and pressure.

Manufacturing Device

Referring to FIG. 7, the manufacturing device 400 comprises a supply roller 410 that supplies a collector 11 and a coating member 420 that applies an electrode active material to a surface of the collector 11 supplied by the supply roller 110. In particular, in the manufacturing device 400, the electrode active material may be applied to the surface of the collector 11 supplied by the supply roller 410 through the coating member 420 to manufacture the electrode 10.

Electrode Heating Device

The electrode heating device 200 comprises a heating body 210 having a drying space 211 through which the electrode 10 manufactured by the manufacturing device 400 passes and a heating member 220 that directly heats and dries the surface of the electrode 10 that passes through the drying space 211 to remove the moisture remaining on the electrode 10.

The electrode heating device may have the same constituents as those of the electrode heating device according to the foregoing first embodiment, and thus, their duplicated description will be omitted.

Lamination Device

In the lamination device 500, the electrode 10, from which the moisture is removed by the heating device 200, and the separator 20 supplied from a separator supply roller (not shown) are alternately laminated to be bonded to each other by heat and pressure. Here, since moisture does not exist on the electrode 10, the electrode 10 and the separator 20 may be thermally bonded to each other more stably.

In the manufacturing system for the secondary battery, which comprises the above-described constituents, according to the third embodiment of the present invention, the surface of the electrode 10 manufactured by the manufacturing device 400 may be directly heated and dried through the electrode heating device 200 to quickly remove the moisture remaining on the electrode 10. Thus, the drying time may be reduced, and the productivity may be improved.

Particularly, the electrode 10 and the separator 20 may be thermally bonded to each other through the lamination device 500 more stably.

Hereinafter, a manufacturing method using the manufacturing system for the secondary battery according to the third embodiment of the present invention will be described.

[Manufacturing Method for Secondary Battery According to the Third Embodiment]

In a manufacturing method for a secondary battery according to a third embodiment of the present invention, an electrode active material 12 is applied to a surface of a collector 11 through a manufacturing device 400 to manufacture an electrode 10. The manufactured electrode 10 is introduced into a drying space 211 through an inlet 212 formed in a heating body 210 of a heating device 200, and the electrode 10 introduced into the drying space 211 is transferred along first to fourth transfer rollers 231, 232, 233, and 234 of a transfer roller 230.

Here, the electrode 10 transferred along the first to fourth transfer rollers 231, 232, 233, and 234 may be continuously heated and dried by heating members 220, which are respectively disposed between the first transfer roller 231 and the second transfer roller 232, between the second transfer roller 232 and the third transfer roller 233, and between the third transfer roller 233 and the fourth transfer roller 234. Thus, the moisture remaining on the electrode 10 may be completely removed.

Particularly, each of the heating members 220 may directly heat and dry both surfaces of the electrode 10 through a plurality of heating lamps 222 to quickly remove the moisture remaining on the electrode 10, and an exhaust member 240 may discharge air from the drying space 211 to the outside to increase in drying rate of the electrode 10.

Here, when a lifespan of a heating lamp among the plurality of heating lamps 222 is ended, the plurality of heating lamps 222 may be withdrawn from the drying space 211 due to a fixed plate 221a and a guide plate 221b of a mounting part 221 provided in the heating member 220. Thus, the heating lamp may be easily replaced.

The electrode 10 transferred through the fourth transfer roller 234 may be discharged through an outlet 213 of the heating body 210, and subsequently, the electrode 10 discharged through the outlet 213 and the separator 10 may be introduced into a lamination device 500 while the electrode 10 and the separator 20 are laminated and be thermally bonded to each other. Here, since moisture does not exist on the electrode 10, the electrode 10 and the separator 20 may be thermally bonded to each other stably.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode heating device for drying an electrode, the electrode heating device comprising:
   a heating body including a drying space through which the electrode passes; and
   a heating member that directly heats and dries a surface of the electrode that passes through the drying space to remove moisture from the electrode,
   wherein the heating member comprises:
      a mounting part provided in the drying space; and
      a plurality of heating lamps installed on the mounting part and disposed close to the surface of the electrode to directly heat and dry the surface of the electrode, thereby removing the moisture from the electrode,
   wherein the mounting part comprises:
      a fixed plate provided in the drying space; and
      a guide plate which is slidably coupled to the fixed plate and on which the plurality of heating lamps are installed,
   wherein the plurality of heating lamps are arranged in a matrix pattern comprising a plurality of rows and a plurality of columns on the guide plate and is configured so that all of the plurality of heating lamps are removed from the fixed plate simultaneously,
   wherein each of the plurality of heating lamps is individually replaceable from the guide plate,
   wherein the heating body comprises an inlet which is provided through a left surface and through which the electrode is introduced, an outlet which is provided through a right surface and through which the electrode introduced into the drying space is discharged, and a cover coupled to one surface between the inlet and the outlet,
   wherein the cover is opened and separated from the heating body so that the drying space communicates with an outside,
   wherein the guide plate is coupled to the fixed plate and is slid toward the cover to be withdrawn from the drying space when the cover is opened,
   wherein the heating lamp is spaced from the surface of the elect by a distance of 2 mm to 10 mm,
   wherein the fixed plate includes a guide groove, and the guide plate includes a guide protrusion slidably coupled to the guide groove,
   wherein each of the fixed plate and the guide plate is made of a material that absorbs heat generated from the plurality of heating lamps to release the heat to an outside, and
   wherein the guide protrusion slidably coupled to the guide groove forms a dovetail joint.

2. The electrode heating device of claim 1, wherein the heating body further comprises a transfer roller that transfers the electrode introduced into the drying space,
   the transfer roller comprises a first transfer roller disposed on an inlet-side of the drying space, a second transfer roller disposed on an upper portion of a left side of the drying space, a third transfer roller disposed on an upper portion of a right side of the drying space, and a fourth transfer roller disposed on an outlet-side of the drying space,
   the heating member is provided at one or more places between the first transfer roller and the second transfer roller, between the second transfer roller and the third transfer roller, and between the third transfer roller and the fourth transfer roller, and the electrode introduced into the drying space is transferred along the first to fourth transfer rollers and dried by the heating member.

3. The electrode heating device of claim 2, wherein the heating member is provided to correspond to each of a first surface and a second surface of the electrode to directly heat and dry the both first and second surfaces of the electrode at the same time.

4. The electrode heating device of claim 3, wherein the heating member that heats one surface of the first and second surfaces of the electrode, which faces a wall of the drying space, is installed on the wall of the drying space, and the heating member that dries the other surface of the first and second surfaces of the electrode is installed on an auxiliary frame provided within the drying space.

5. The electrode heating device of claim 1, further comprising an exhaust member that discharges air containing the moisture from the drying space to an outside.

6. The electrode heating device of claim 5, wherein the exhaust member comprises an exhaust duct disposed on an outer surface of the heating body to discharge the air from the drying space to the outside and an exhaust pump that generates a suction force to forcibly discharge the air from the drying space to the outside through the exhaust duct.

7. The electrode heating device of claim 1, wherein the heating lamp is an infrared lamp or a xenon lamp.

8. A manufacturing system for a secondary battery, comprising:

a supply device that supplies an electrode;

an electrode heating device that directly heats and dries a surface of the electrode supplied from the supply device to remove moisture from the electrode; and a collection device that collects the electrode from which the moisture is removed by the electrode heating device, wherein the electrode heating device comprises:

a heating body having a drying space through which the electrode supplied from the supply device passes; and a heating member that directly heats and dries the surface of the electrode that passes through the drying space to remove the moisture from the electrode, wherein the heating member comprises:

a mounting part provided in the drying space; and a plurality of heating lamps installed on the mounting part and disposed close to the surface of the electrode to directly heat and dry the surface of the electrode, thereby removing the moisture from the electrode, wherein the mounting part comprises:

a fixed plate provided in the drying space; and a guide plate which is slidably coupled to the fixed plate and on which the plurality of heating lamps are installed, wherein the plurality of heating lamps are arranged in a matrix pattern comprising a plurality of rows and a plurality of columns on the guide plate and is configured so that all of the plurality of heating lamps are removed from the fixed plate simultaneously, wherein each of the plurality of heating lamps is individually replaceable from the guide plate, wherein the heating body comprises an inlet which is provided through a left surface and through which the electrode is introduced, an outlet which is provided through a right surface and through which the electrode introduced into the drying space is discharged, and a cover coupled to one surface between the inlet and the outlet, wherein the cover is opened and separated from the heating body so that the drying space communicates with an outside, wherein the guide plate is coupled to the fixed plate and is slid toward the cover to be withdrawn from the drying space when the cover is opened, wherein the heating lamp is spaced from the surface of the electrode by a distance of 2 mm to 10 mm, wherein the fixed plate includes a guide groove, and the guide plate includes a guide protrusion slidably coupled to the guide groove, wherein each of the fixed plate and the guide plate is made of a material that absorbs heat generated from the plurality of heating lamps to release the heat to an outside, and wherein the guide protrusion slidably coupled to the guide groove forms a dovetail joint.

9. A manufacturing system for a secondary battery, comprising:

a manufacturing device that manufactures an electrode;

an electrode heating device that directly heats and dries a surface of the electrode manufactured by the manufacturing device to remove moisture from the electrode; and a lamination device that alternately laminates the electrode, from which the moisture is removed by the electrode heating device, and a separator to bond the electrode and the separator to each oilier using heat and pressure, wherein the electrode heating device comprises:

a heating body having a drying space through which the electrode manufactured by the manufacturing device passes; and a heating member that directly heats and dries the surface of the electrode that passes through the drying space to remove the moisture from the electrode, wherein the heating member comprises:

a mounting part provided in the drying space; and a plurality of heating lamps installed on the mounting part and disposed close to the surface of the electrode to directly heat and dry the surface of the electrode, thereby removing the moisture from the electrode, wherein the mounting part comprises:

a fixed plate provided in the drying space; and a guide plate which is slidably coupled to the fixed plate and on which the plurality of heating lamps are installed, wherein the plurality of heating lamps are arranged in a matrix pattern comprising a plurality of rows and a plurality of columns on the guide plate and is configured so that all of the plurality of heating lamps are removed from the fixed plate simultaneously, wherein each of the plurality of heating lamps is individually replaceable from the guide plate, wherein the heating body comprises an inlet which is provided through a left surface and through which the electrode is introduced, an outlet which is provided through a right surface and through which the electrode introduced into the drying space is discharged, and a cover coupled to one surface between the inlet and the outlet, wherein the cover is opened and separated from the eating body so that, the drying space communicates with an outside, wherein the guide plate is coupled to the fixed plate and is slid toward the cover to be withdrawn from the drying space when the cover is opened, wherein the heating lamp is spaced from the surface of the electrode by a distance of 2 ram to 10 mm, wherein the fixed plate includes a guide groove, and the guide plate includes a guide protrusion slidably coupled to the guide groove, wherein each of the fixed plate and the guide plate is made of a material that absorbs heat generated from the plurality of heating lamps to release the heat to an outside, and wherein the guide protrusion slidably coupled to the guide groove forms a dovetail joint.

* * * * *